United States Patent
Garmiza et al.

(10) Patent No.: US 9,141,295 B2
(45) Date of Patent: Sep. 22, 2015

(54) LOAD BALANCING OF DATA READS IN STORAGE ENVIRONMENTS

(75) Inventors: Ehood Garmiza, Neve Ziv (IL); Shemer Schwarz, Tel-Aviv (IL); Gary Weiss, Tel-Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1153 days.

(21) Appl. No.: 12/775,325

(22) Filed: May 6, 2010

(65) Prior Publication Data

US 2011/0276758 A1  Nov. 10, 2011

(51) Int. Cl.
*G06F 3/06* (2006.01)
*G06F 11/20* (2006.01)

(52) U.S. Cl.
CPC ............ *G06F 3/0613* (2013.01); *G06F 3/0659* (2013.01); *G06F 3/0689* (2013.01); *G06F 3/065* (2013.01); *G06F 11/2056* (2013.01); *G06F 2206/1012* (2013.01)

(58) Field of Classification Search
CPC ... G06F 3/0613; G06F 3/0659; G06F 3/0689; G06F 2206/1012; G06F 3/065; G06F 11/2056
USPC ................................ 711/114, 162; 710/18, 39
See application file for complete search history.

(56) References Cited

U.S. PATENT DOCUMENTS 6,611,827 B1    8/2003  Riedle
7,228,395 B2 *  6/2007  Keohane et al. .............. 711/162

OTHER PUBLICATIONS

Vickson, et al., Optimal positioning of read/write heads in mirrored disks, Dept of Management Sciences, Univ of Waterloo, Ontario; Information and Computing Science Div, Lawrence Berkeley Laboratory, CA; Dept of Marketing and Quantitative Studies, San Jose State University, CA; available online Feb. 14, 2000.

* cited by examiner

*Primary Examiner* — Michael Alsip
(74) *Attorney, Agent, or Firm* — Griffiths & Seaton PLLC

(57) ABSTRACT

Exemplary method, system, and computer program product embodiments for, within a data storage system performing data mirroring, performing load balancing pursuant to completing a read request. At least one of a preferred storage controller and preferred storage device to accommodate the read request is determined by performing one of selecting a request queue having a closest offset to an offset of the read request, selecting a request queue having a most requests within a predetermined distance of the offset of the read request, selecting a request queue having a closest median offset to the offset of the read request, selecting a request queue having a closest average offset to the offset of the read request, and selecting a request queue having a predetermined additional number of entries than another request queue. The selected request queue is associated with the preferred storage controller and the preferred storage device.

6 Claims, 6 Drawing Sheets

```
input:
R is the set of new requests.
Qa is the set of I/Os currently in the queue for disk A
Qb is the set of I/Os currently in the queue for disk B output:
Ra is the subset of R which will go to disk A
Rb is the subset of R which will go to disk B def get_next_permutation(set R):
  static bitmap permutation_bitmap(size = R.size, start = 0)
  set Ra,Rb Ra = collect_elements_unset(permutation_bitmap, R)
  Rb = collect_elements_set(permutation_bitmap, R)
  permutation_bitmap.increment
  if (permutation_bitmap.iszero()) return (NULL, NULL)

return Ra,Rb def calculate_time_for_queue(set Q):
  time = 0
  previous_r = NULL
  sorted = Q.sort()

for (r in Q)
    if (previous_r == NULL)
        previous_r = r
    else
        time += (r.offset - previous_r.offset) * TIME_PER_DISTANCE + SEEK_TIME
  return time def choose_optimal_distribution(set R, set QA, set QB):

best_time = infinity
  best_set_for_diskA = {}
  best_set_for_diskB = {}
  while (1)
    (Ra, Rb) = get_next_permutation(Ri)
    if ((Ra== 0) and (Rb == 0)) break
    timeA = calculate_time_for_queue(QAi + Ra)
    timeB = calculate_time_for_queue(QBi + Rb)
    time_for_this_permutation = timeA + timeB
    if (time_for_this_permutation < best_time)
      best_time = time_for_this_permutation
      best_set_for_diskA = Ra
      best_set_for_diskB = Rb return (best_set_for_diskA, best_set_for_diskB)
```

FIG. 3

LOAD BALANCING OF DATA READS IN STORAGE ENVIRONMENTS

BACKGROUND OF THE INVENTION

1. Field of the Invention

The present invention relates in general to computers, and more particularly to apparatus, method and computer program product embodiments for, in a data storage system performing data mirroring, load balancing of data reads in storage environments.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE DESCRIBED EMBODIMENTS

Storage architectures often include one or more storage controllers responsible for a certain number of storage devices under their control. In this regard, storage controllers facilitate providing one or more interfaces between the user and the storage devices while managing one or more storage aspects such as redundant array of independent disks (RAID) configurations, failover, replication, snapshots, and the like.

Data mirroring is a process seen in many computing environments for a variety of purposes, including enhancing security, providing data redundancy, and other factors. While several variants of mirroring are seen, typically a dataset is stored in a first storage location on a first storage device, and a mirrored copy of the dataset is stored in a second location, perhaps on a second storage device, and perhaps in a remote setting from the first location.

In mirrored storage environments, it is advantageous to load balance the operation of associated storage controllers, for example in order to provide greater efficiency, lower cost, and increase bandwidth. An exemplary challenge is presented when a new read request is received, and a decision must be made as to which of the mirrored storage devices (and/or associated storage controller) on which the data is found (and/or associated), should be utilized. A need exists for a mechanism whereby a determination may be made as to an appropriate storage device (and associated preferred storage controller) to accommodate read requests in order to appropriately load balance the data storage system.

Accordingly, various exemplary method, apparatus, and computer program product embodiments are provided for, within a data storage system performing data mirroring, performing load balancing pursuant to completing a read request. At least one of a preferred storage controller and preferred storage device to accommodate the read request is determined by performing one of selecting a request queue having a closest offset to an offset of the read request, selecting a request queue having a most requests within a predetermined distance of the offset of the read request, selecting a request queue having a closest median offset to the offset of the read request, selecting a request queue having a closest average offset to the offset of the read request, and selecting a request queue having one of a predetermined additional number of entries and a predetermined percentage of entries than another request queue. The selected request queue is associated with the at least one of the preferred storage controller and the preferred storage device.

In addition to the foregoing exemplary embodiment, various other method, apparatus, and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 3 is code of an exemplary method for performing load balancing in accordance with the present invention;

DETAILED DESCRIPTION OF THE DRAWINGS

As previously indicated, the illustrated embodiments provide exemplary mechanisms for efficiently addressing load balancing challenges in mirror storage environments by determining an associated storage device and/or storage controller to be responsible for accommodating an incoming read request. In one of the illustrated embodiments, the mechanisms of the present invention analyze the request queue of each candidate storage device (such as a disk, LUN, module, or other storage unit) capable of serving the data. Based on such analysis, the read request is submitted to the storage device that is already planning on visiting storage regions adjacent to the region needed by the instant read request. Since all possible permutations are considered and evaluated, the chosen permutation is necessarily the globally optimal solution.

Figure 1:
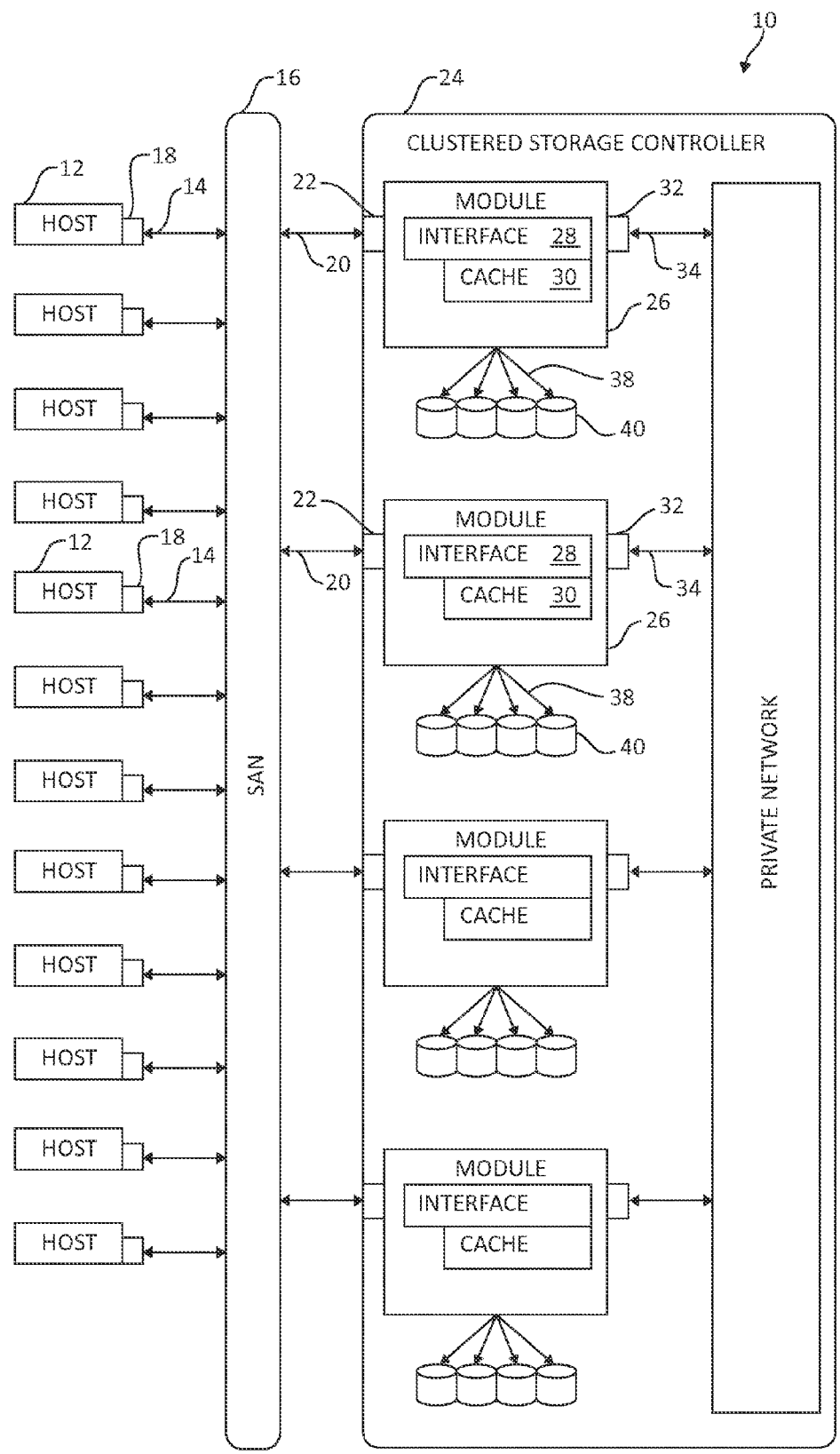
FIG. 1 is a block diagram of an exemplary computing storage environment in accordance with certain embodiments.

Turning now to the drawings, reference is initially made to FIG. 1, which is a block diagram of an exemplary data processing storage subsystem 10, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

The storage subsystem 10 receives, from one or more host computers 12, input/output (I/O) requests, which are commands to read or write data at logical addresses on logical volumes. Any number of host computers 12 is coupled to the storage subsystem 10 by any means known in the art, for example, using a network. Herein, by way of example, the host computers 12 and the storage subsystem 10 are assumed to be coupled by a Storage Area Network (SAN) 16 incorporating data connections 14 and Host Bus Adapters (HBAs) 18. The logical addresses specify a range of data blocks within a logical volume, each block herein being assumed by way of example to contain 512 bytes. For example, a 10 KB data record used in a data processing application on a host computer would require 20 blocks, which the host computer might specify as being stored at a logical address comprising blocks 1000 through 1019 of a logical volume. The storage subsystem 10 typically operates in, or as, a network attached storage (NAS) or a SAN system.

The storage subsystem 10 comprises a clustered storage controller 24 coupled between the SAN 16 and private network 36 using data connections 20 and 34, respectively, and incorporating adapters 22 and 32, again respectively. Clustered storage controller 24 implements clusters of storage modules 26, each of whom includes an interface 28 (in communication between adapters 22 and 32), and a cache 30. Each storage module 26 is responsible for a number of disks 40 by way of data connection 38 as shown.

As described previously, each storage module 26 further comprises a cache 30. However, it will be appreciated that the number of caches used in the storage subsystem 10 and in conjunction with clustered storage controller 24 may be any convenient number. While all caches 30 in the storage subsystem 10 may operate in substantially the same manner and to comprise substantially similar elements, this is not a requirement. Each of the caches 30 is typically, but not necessarily approximately equal in size and is assumed to be coupled, by way of example, in a one-to-one correspondence with a set of physical storage units, which are typically disks. In one embodiment, the disks 40 may comprise such disks. Those skilled in the art will be able to adapt the description herein to caches of different sizes.

Each set of physical storage comprises multiple slow and/or fast access time mass storage devices, herein below assumed to be multiple hard disks. FIG. 1 shows the caches 30 coupled to respective sets of physical storage. Typically, the sets of physical storage comprise one or more disks 40, which can have different performance characteristics. In response to an I/O command, the cache 30, by way of example, may read or write data at addressable physical locations of physical storage. In the embodiment of FIG. 1, the caches 30 are shown to exercise certain control functions over the physical storage. These control functions may alternatively be realized by hardware devices such as disk controllers, which are linked to the caches 30.

Routing records, indicating the association of logical addresses of logical volumes with partitions and the association of the partitions with caches, are distributed by the SAN 16 to one or more generally similar network interfaces 28 of the storage modules 26. It will be understood that the storage subsystem 10, and thereby, the clustered storage controller 24, may comprise any convenient number of network interfaces 28. Subsequent to the formation of the disks 40, the network interfaces 28 receive I/O commands from the host computers 12 specifying logical addresses of the disks 40. The network interfaces use the routing records to break the commands into I/O instructions, or command subsets, that are then distributed among the caches 30.

Each storage module 26 is operative to monitor its state, including the states of associated caches 30, and to transmit configuration information to other components of the storage subsystem 10 for example, configuration changes that result in blocking intervals, or limit the rate at which I/O requests for the sets of physical storage are accepted.

Routing of commands and data from the HBAs 18 to the clustered storage controller 24 to each cache 30 is typically performed over a network and/or a switch. Herein, by way of example, the HBAs 18 may be coupled to the storage modules 26 by at least one switch (not shown) of the SAN 16, which can be of any known type having a digital cross-connect function. In addition, the HBAs 18 may be directly coupled to the storage modules 26 in an additional implementation.

Data having contiguous logical addresses are generally distributed among the disks 40. Alternatively, the data can be distributed using other algorithms, e.g., byte or block interleaving. In general, this increases bandwidth, for instance, by allowing a volume in a SAN or a file in network attached storage to be read from or written to more than one disk at a time. However, this technique requires coordination among the various disks, and in practice may require complex provisions for disk failure, and a strategy for dealing with error checking information, e.g., a technique for storing parity information relating to distributed data. Indeed, when logical unit partitions are distributed in sufficiently small granularity, data associated with a single logical unit may span all of the disks 40.

While not explicitly shown for purposes of illustrative simplicity, the skilled artisan will appreciate that in some embodiments, the clustered storage controller 24 may be adapted for implementation in conjunction with certain hardware, such as a rack mount system, a midplane, and/or a backplane. Indeed, the private network 36 in one embodiment may be implemented using a backplane. Additional hardware such as the aforementioned switches, processors, controllers, memory devices, and the like may also be incorporated into the clustered storage controller 24 and elsewhere within the storage subsystem 10, again as the skilled artisan will appreciate. Further, a variety of software components, operating systems, firmware, and the like may be integrated.

Figure 2:
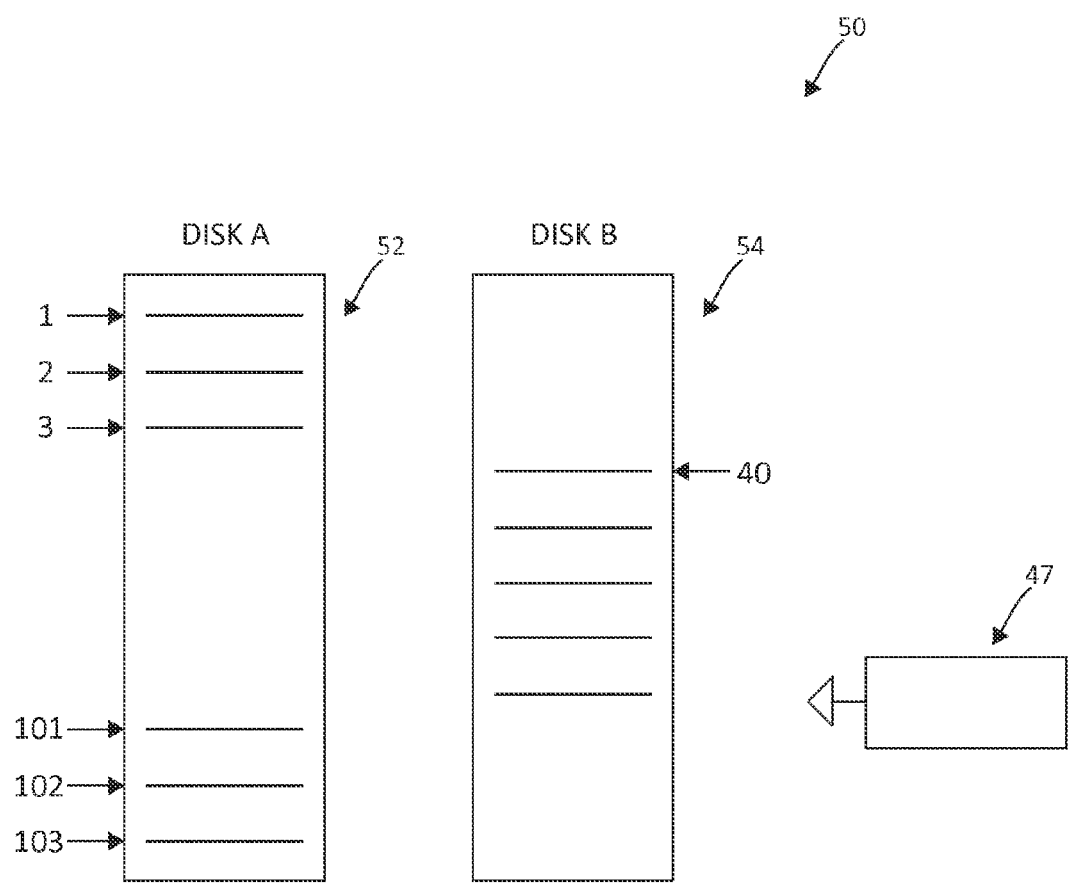
FIG. 2 is a block diagram of exemplary maps of existing read requests in queues of two mirrored storage devices, when presented with an additional read request.

Turning to FIG. 2, a block diagram of various functional elements depicting maps 50 of existing read requests in queues of storage devices (here represented as "disks") A and B are shown (denoted as request queues 52 and 54). Pursuant to FIG. 2, the following scenario may be envisioned. A block of data is mirrored on two devices' controllers (A and B). The request queue of each disk's controller includes requests at the following address offsets (which, following, is sorted by offset):

Request Queue for Disk A: 1, 2, 3, 101, 102, 103
Request Queue for Disk B: 40, 41, 42, 43, 44, 45, 46

A new read request is received as shown. The applicable offset for the read request is 47. According to the illustrated embodiments, the appropriate location in which the request should be forwarded to is disk B. Accordingly, the read request having the offset of 47 should be forwarded to the disk controller B.

In view of the exemplary scenario just described and illustrated pursuant to FIG. 2, the following additional exemplary embodiments may be implemented. In a first embodiment, the queue having a "closest" request may be selected. As will be described, following, the determination of a closest request may be embodied in several possible variations. In the factual scenario previously described, the disk controller B is selected (offset 46). In a second embodiment, the queue having the most requests within N bytes of distance may be selected. In the above example, if a predetermined range is N=20 bytes, the disk controller B is selected because it has seven (7) requests in this range, while disk A has none.

Turning next to FIG. 3, an exemplary algorithm is presented which solves for the globally optimal distribution solution. Given the set of I/Os in queue at the first disk, and the set of I/Os in the queue at the second disk, and a set R of new incoming requests, the algorithm will solve for the optimal way to distribute the set R into two subsets Ra and Rb, which specify which requests should be routed to the first disk and which requests should be routed to the second disk. This algorithm executes in order $O(2^{|r|}*(|Qa|+|Qb|))$, where $|r|$ is the cardinality of the set of incoming requests, $|Qa|$ is the cardinality of the set of requests in the queue at the first disk, and $|Qb|$ is the cardinality of the set of requests in the queue at the second disk.

Figure 4:
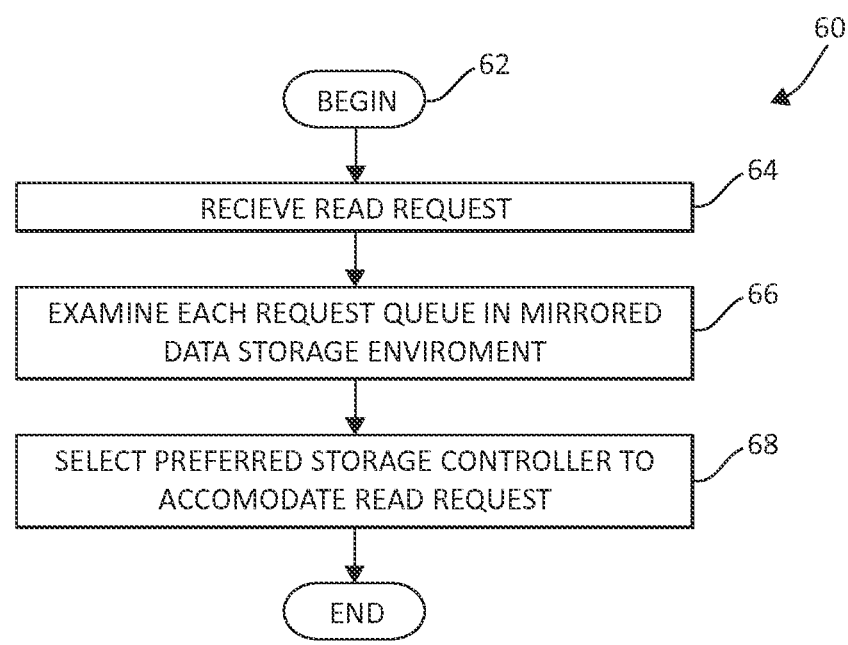
FIG. 4 is a flow chart diagram of an exemplary method for load balancing according to aspects of the present invention.

Turning next to FIG. 4, an exemplary method 60 for performing load balancing according to various aspects of the present invention is illustrated. Method 60 begins (step 62) with the receipt of a read request in the data storage environment (step 64). Pursuant to accommodating the read request, the method 60 then examines each request queue in the mirrored data storage environment (step 66). In many embodiments this may entail reviewing a primary queue and a corresponding mirrored queue. One of ordinary skill in the art will appreciate, however, that additional mirrored environments having more than two queues are contemplated.

Based on the examination of each request queue in the environment, and pursuant to one or more of the aforementioned possible embodiments, a determination is made as to a preferred storage controller (and/or associated storage device) to be used to accommodate the read request (step 68). Additional detail describing such determinations will be further described, following, in two exemplary embodiments. Following the determination of the appropriate storage device/storage controller, the method 60 ends (step 70). One of ordinary skill in the art will appreciate that the method 60 extends to the receipt of a single set of multiple read requests (step 64) and provides preferred storage controller for each read request in the set (step 68).

Figure 5:
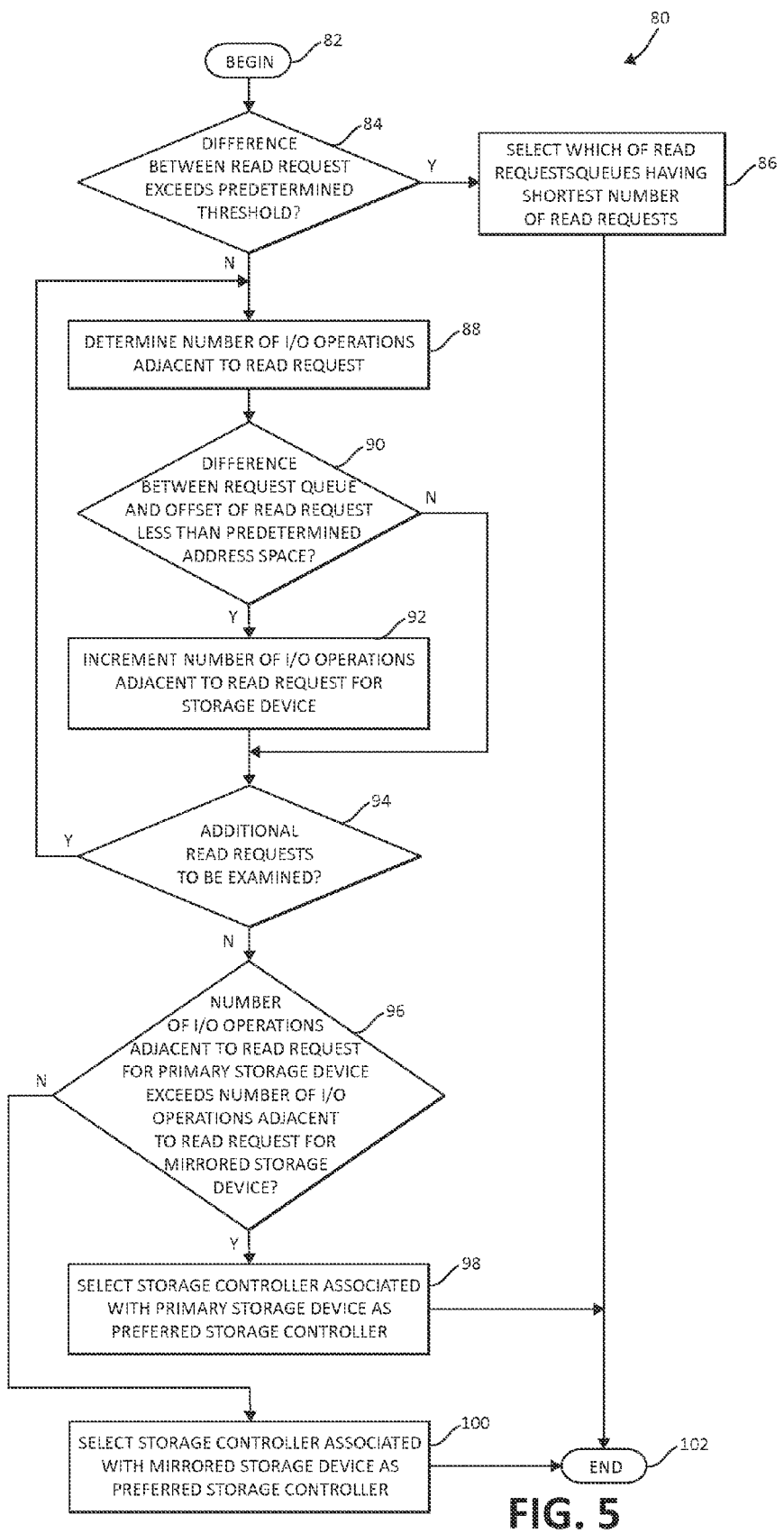
FIG. 5 is a flow chart diagram of additional detail of an exemplary method for load balancing according to aspects of the present invention.

FIG. 5, following, illustrates a possible exemplary embodiment describing the decision making process for selection of an appropriate storage controller and/or storage device to accommodate a received read request. Method 80 begins (step 82), following the examination of each queue in the mirrored storage environment capable of accommodating the read request, by querying whether a difference between read requests (queue A-queue B, for example) exceeds a predetermined threshold (step 84). If this is the case (indicating that one or more queues is processing proportionately more work than an alternative queue), then the queue having the shortest number of existing read requests is selected (step 86) in a preliminary matter without further calculation.

Alternatively, and returning to step 84, if the difference does not exceed the threshold, then the method 80 moves to step 88, where an existing number of input/output (I/O) operations adjacent to the instant read request is determined for a particular queue. If a difference between the particular request queue and an address offset of the instant read request is less than a predetermined address space (step 90), then the existing number of I/O operations is incremented (step 92). Steps 88-92 are performed for each of a possible number of read requests (such as for a number of read requests received over a period of time, or a number of concurrently received read requests, or another mechanism known to one of ordinary skill in the art), and for each possible request queue capable of accommodating the read request(s). Once each read request/request queue has been examined in this manner (step 94), the method 80 moves to step 96.

In step 96, the method 80 examines the resulting number of adjacent I/O operations in both the primary and mirrored request queues (pursuant to the incrementing activities of steps 88-92 described previously) to determine which request queue exceeds the alternative queue(s). The request queue having the highest number is selected, and the storage device and/or storage controller associated with this request queue is selected as preferred (steps 98 or 100). The method 80 then ends (step 102).

Figure 6:
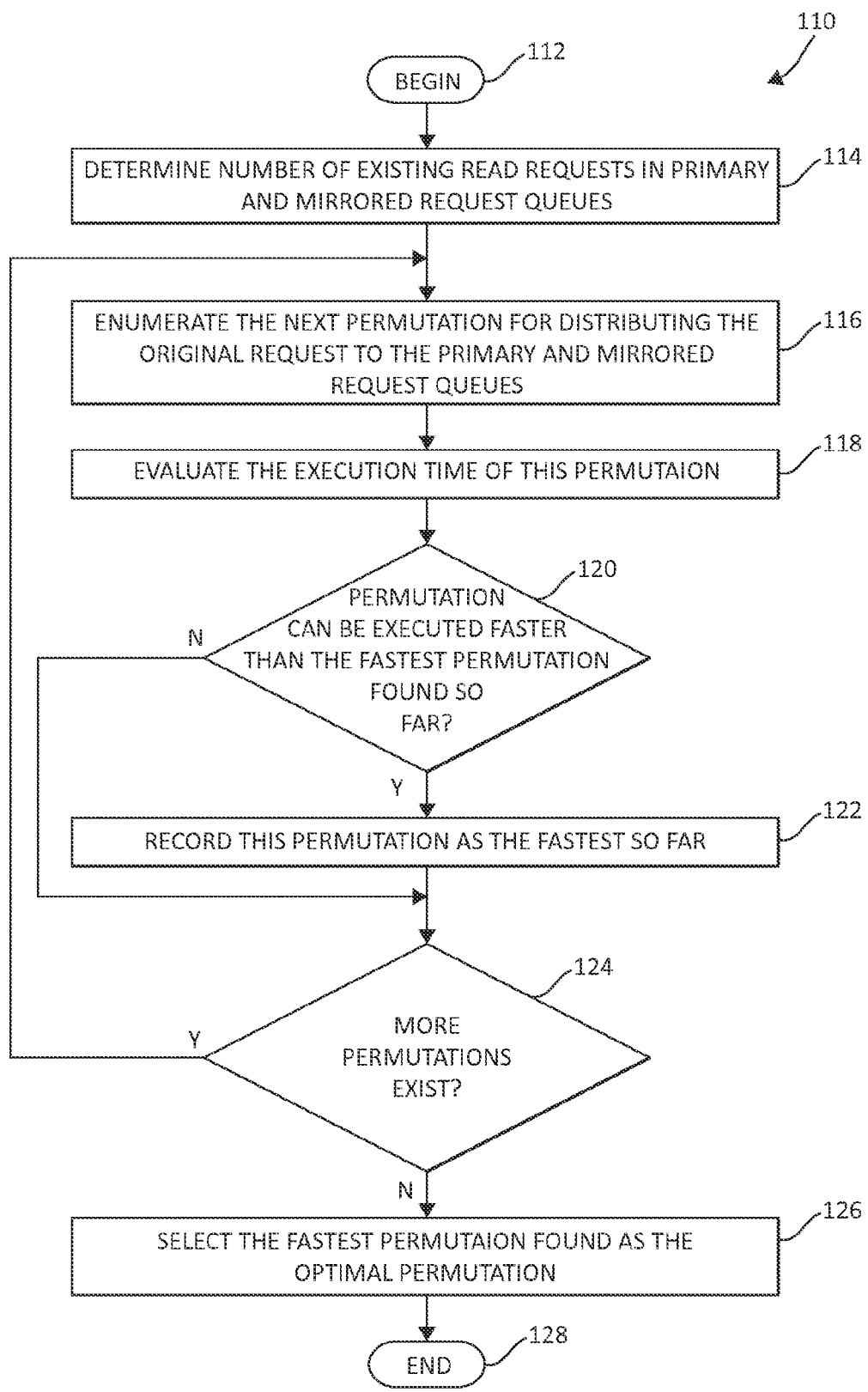
FIG. 6 is a flow chart diagram of an alternative embodiment of an exemplary method for load balancing according to aspects of the present invention.

In FIG. 6, following, an alternative embodiment for performing load balancing is described in an exemplary method 110, where an optimal subset Ra, Rb of a number of read requests is selected for request queues Qa and Qb. FIG. 6 is depicted in conjunction with the exemplary code depicted in FIG. 3. One of ordinary skill in the art will appreciate that the exemplary code shown in FIG. 3 may be altered in various ways to better suit the method 110 shown in FIG. 6, or vice-versa.

Method 110 begins (step 112) with a determination of a number of existing read requests in the primary and mirrored request queues (step 114). The method 110 then enumerates the next permutation (of a differing combination of new read requests in each queue) for distributing the original request to the primary and mirrored request queues (step 116). An execution time is evaluated for this permutation (step 118). This execution time, may, as one of ordinary skill in the art will expect, be defined and vary according to a particular implementation. For example, in one embodiment, the execution time may include a calculation of a time to move a specified address distance (e.g., a seek time). In other embodiments, the read time may include various other considerations known to one of ordinary skill in the art.

The method then moves to step 120, where the method 110 queries if this permutation can be executed faster than the previous permutation found so far. If this is the case, the current permutation is recorded as the fastest so far (step 122). If not, the method 100 moves to step 124 to determine if additional permutations exist. If this is the case, the method returns to step 116 to perform additional analysis. Alternatively, the fastest permutation's set Ra, Rb of read requests is selected for each of the primary and mirrored request queues as the optimal set (step 126). This optimal selection is returned, and the method 110 ends (step 128).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method within a data storage system performing data mirroring for performing load balancing pursuant to completing a read request, comprising:

examining each request queue in the data storage system performing the data mirroring;

determining at least one of a preferred storage controller and preferred storage device to accommodate the read request by performing one of:

selecting a request queue having a closest offset to an offset of the read request, selecting a request queue having a most requests within a predetermined distance of the offset of the read request, selecting a request queue having a closest average offset to the offset of the read request; wherein the selected request queue is associated with the at least one of the preferred storage controller and preferred storage device, wherein the preferred storage device is at least one of a first storage device and a second storage device in the data storage system;

determining if a difference between a number of read requests in a first request queue and a number of read requests in a second request queue exceeds a predetermined threshold;

selecting which of the first and second request queues having a shortest number of read requests if the difference between the number of read requests in the first request queue and the number of read requests in the second request queue exceeds the predetermined threshold;

if the difference between the number of read requests in the first request queue and the number of read requests in the second request queue does not exceed the predetermined threshold;

determining a number of input/output (I/O) operations adjacent to the read request for each of the first and the second storage device, for each of a plurality of read requests, if a first difference between a first request queue of the first storage device and the offset of the read request is less than a predetermined address space, incrementing the number of I/O operations adjacent to the read request for the first storage device and determining if additional read requests are to be examined pursuant to the incrementing the number of I/O operations adjacent to the read request for the first storage device, wherein:
if there are additional read requests to be examined pursuant to the incrementing the number of I/O operations adjacent to the read request for the first storage device:
incrementing the number of I/O operations adjacent to the read request for the second storage device if a second difference between a second request queue of the second storage device and the offset of the read request is less than the predetermined address space, and
if there are no additional read requests to be examined pursuant to the incrementing the number of I/O operations adjacent to the read request for the first storage device:
selecting a storage controller associated with the first storage device as the preferred storage controller if the number of I/O operations adjacent to the read request for the first storage device exceeds the number of I/O operations adjacent to the read request for the second storage device, otherwise selecting a storage controller associated with the second storage device as the preferred storage.

2. The method of claim 1, further including initializing the number of I/O operations adjacent to the read request to zero (0).

3. A system, within a data storage system performing data mirroring, for performing load balancing pursuant to completing a read request, comprising:
a plurality of storage devices;
a plurality of storage controllers in communication with the plurality of storage devices operational in the data storage system, wherein at least one of the plurality of storage controllers is adapted for:
examining each request queue in the data storage system performing the data mirroring;
determining at least one of a preferred storage controller and a preferred storage device to accommodate the read request by performing one of:
selecting a request queue having a closest offset to an offset of the read request,
selecting a request queue having a most requests within a predetermined distance of the offset of the read request,
selecting a request queue having a closest average offset to the offset of the read request; wherein the selected request queue is associated with the at least one of the preferred storage controller and preferred storage device, wherein the preferred storage device is at least one of a first storage device and a second storage device in the data storage system;
determining if a difference between a number of read requests in a first request queue and a number of read requests in a second request queue exceeds a predetermined threshold;
selecting which of the first and second request queues having a shortest number of read requests if the difference between the number of read requests in the first request queue and the number of read requests in the second request queue exceeds the predetermined threshold;
if the difference between the number of read requests in the first request queue and the number of read requests in the second request queue does not exceed the predetermined threshold;
determining a number of input/output (I/O) operations adjacent to the read request for each of the first and the second storage device,
for each of a plurality of read requests, if a first difference between a first request queue of the first storage device and the offset of the read request is less than a predetermined address space, incrementing the number of I/O operations adjacent to the read request for the first storage device and determining if additional read requests are to be examined pursuant to the incrementing the number of I/O operations adjacent to the read request for the first storage device, wherein:
if there are additional read requests to be examined pursuant to the incrementing the number of I/O operations adjacent to the read request for the first storage device:
incrementing the number of I/O operations adjacent to the read request for the second storage device, if a second difference between a second request queue of the second storage device and the offset of the read request is less than the predetermined address space, and
if there are no additional read requests to be examined pursuant to the incrementing the number of I/O operations adjacent to the read request for the first storage device:
selecting a storage controller associated with the first storage device as the preferred storage controller if the number of I/O operations adjacent to the read request for the first storage device exceeds the number of I/O operations adjacent to the read request for the second storage device, otherwise selecting a storage controller associated with the second storage device as the preferred storage.

4. The system of claim 3, wherein the at least one storage controller is further adapted for initializing the number of I/O operations adjacent to the read request to zero (0).

5. A computer program product for, within a data storage system performing data mirroring, performing load balancing pursuant to completing a read request, the computer program product comprising a computer-readable storage medium having computer-readable program code portions stored therein, the computer-readable program code portions comprising:
a first executable portion for:
examining each request queue in the data storage system performing the data mirroring;
determining at least one of a preferred storage controller and preferred storage device to accommodate the read request by performing one of:
selecting a request queue having a closest offset to an offset of the read request,
selecting a request queue having a most requests within a predetermined distance of the offset of the read request, and
selecting a request queue having a closest average offset to the offset of the read request; wherein the selected request queue is associated with the at least one of the preferred storage controller and preferred storage device, wherein the preferred storage device is at least one of a first storage device and a second storage device in the data storage system;

determining if a difference between a number of read requests in a first request queue and a number of read requests in a second request queue exceeds a predetermined threshold;

selecting which of the first and second request queues having a shortest number of read requests if the difference between the number of read requests in the first request queue and the number of read requests in the second request queue exceeds the predetermined threshold;

if the difference between the number of read requests in the first request queue and the number of read requests in the second request queue does not exceeds the predetermined threshold;

determining a number of input/output (I/O) operations adjacent to the read request for each of the first and the second storage device, for each of a plurality of read requests, if a first difference between a first request queue of the first storage device and the offset of the read request is less than a predetermined address space, incrementing the number of I/O operations adjacent to the read request for the first storage device and determining if additional read requests are to be examined pursuant to the incrementing the number of I/O operations adjacent to the read request for the first storage device, wherein:

if there are additional read requests to be examined pursuant to the incrementing the number of I/O operations adjacent to the read request for the first storage device:

incrementing the number of I/O operations adjacent to the read request for the second storage device if a second difference between a second request queue of the second storage device and the offset of the read request is less than the predetermined address space, and if there are no additional read requests to be examined pursuant to the incrementing the number of I/O operations adjacent to the read request for the first storage device:

selecting a storage controller associated with the first storage device as the preferred storage controller if the number of I/O operations adjacent to the read request for the first storage device exceeds the number of I/O operations adjacent to the read request for the second storage device, otherwise selecting a storage controller associated with the second storage device as the preferred storage.

6. The computer program product of claim 5, further including a fifth executable portion for initializing the number of I/O operations adjacent to the read request to zero (0).

* * * * *